United States Patent
Woo

(10) Patent No.: US 8,625,115 B2
(45) Date of Patent: Jan. 7, 2014

(54) IMAGE FORMING APPARATUS AND PRINT DATA PROCESSING METHOD TO PRINT AT AN ENHANCED SPEED

(75) Inventor: Hong-rok Woo, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1044 days.

(21) Appl. No.: 12/268,007

(22) Filed: Nov. 10, 2008

(65) Prior Publication Data

US 2009/0128837 A1    May 21, 2009

(30) Foreign Application Priority Data

Nov. 21, 2007    (KR) .................. 10-2007-0119416

(51) Int. Cl.
*H04N 1/60* (2006.01)
*G06F 3/12* (2006.01)

(52) U.S. Cl.
USPC ........................................ 358/1.13; 358/1.15

(58) Field of Classification Search
USPC ............................................. 358/1.13, 1.15
See application file for complete search history.

(56) References Cited

U.S. PATENT DOCUMENTS

| | | | | |
|---|---|---|---|---|
| 5,680,522 A | * | 10/1997 | Kasai | 358/1.14 |
| 6,456,404 B1 | * | 9/2002 | Furuya et al. | 358/523 |
| 2003/0030837 A1 | * | 2/2003 | Simpson et al. | 358/1.15 |
| 2004/0169902 A1 | * | 9/2004 | Yaguchi | 358/524 |
| 2005/0168763 A1 | * | 8/2005 | Higuchi et al. | 358/1.13 |
| 2007/0110459 A1 | * | 5/2007 | Oominami et al. | 399/38 |

FOREIGN PATENT DOCUMENTS

| | | |
|---|---|---|
| JP | 09-331462 A | 12/1997 |
| JP | 11-017967 A | 1/1999 |
| JP | 2006-350443 A | 12/2006 |
| JP | 2007-074049 A | 3/2007 |
| JP | 2007-106066 A | 4/2007 |
| KR | 10-200500064710 A | 6/2005 |

OTHER PUBLICATIONS

Machine translation for JP 11-017967.*
Korean Notice of Allowance mailed Sep. 21, 2012 in application No. 10-2007-0119416.

* cited by examiner

*Primary Examiner* — Qian Yang
(74) *Attorney, Agent, or Firm* — Staas & Halsey LLP

(57) ABSTRACT

A print data processing method of an image forming apparatus that has a storage unit includes: setting at least one print speed enhancing mode; performing a pre-processing corresponding to the set print speed enhancing mode; and processing the print data by using a result of the pre-processing.

22 Claims, 8 Drawing Sheets

PRINT SPEED ENHANCING MODE 1 MEMORY USED X Mb (Y MB REMAINING)
PRINT SPEED ENHANCING MODE2 MEMORY USED X' Mb (Y' MB REMAINING)
PRINT SPEED ENHANCING MODE3 MEMORY USED X" Mb (Y" MB REMAINING)

IMAGE FORMING APPARATUS AND PRINT DATA PROCESSING METHOD TO PRINT AT AN ENHANCED SPEED

CROSS-REFERENCE TO RELATED APPLICATION

This application claims priority from Korean Patent Application No. 2007-119416, filed on Nov. 21, 2007 in the Korean Intellectual Property Office, the disclosure of which is incorporated herein by reference.

BACKGROUND OF THE INVENTION

1. Field of the Invention

Apparatuses and methods consistent with aspects of the present invention relate to an image forming apparatus and a print data processing method thereof, and more particularly, to an image forming apparatus that improves a print speed, and a print data processing method thereof.

2. Description of the Related Art

An image forming apparatus (such as a printer) interprets input data transmitted from an image processing apparatus (such as a computer system or an external storage apparatus) according to a print language, renders the interpreted data and processes print data to print the processed data. More specifically, the image forming apparatus extracts information (such as colors and patterns) from the input data, interprets the extracted information, converts colors and generates patterns to generate final print data. The color conversion may include color correction.

The image forming apparatus requires much time in interpreting the color and pattern information from the input data to generate the print data. Because the color-converting time and pattern-generating time account for much of the overall print time, the print speed decreases sharply if the input data have a large quantity of color and pattern information.

The image forming apparatus consistently maintains result values to convert colors and to generate patterns. For example, the image forming apparatus corrects colors of original RGB data among the input data to generate new RGB data, and converts the new RGB data into CMYK data during a color-converting process. If coordinate values of the original RGB data are equivalent, those of the converted CMYK are equivalent also.

That is, while processing print data to interpret a print language, the image forming apparatus repeats operations generating the same result values whenever receiving a print command, which lowers efficiency.

SUMMARY OF THE INVENTION

Accordingly, there is provided an image forming apparatus that stores an anticipated result value of a processing having equivalent result values and processes print data by using the stored anticipated result value to improve a print speed if a print command is received, and a print data processing method thereof.

Also, there is provided an image forming apparatus that performs in advance a processing having equivalent result values, avoids repetitive operations by using the result value and improves operation efficiency, and a print data processing method thereof.

Additional aspects of the present invention will be set forth in part in the description which follows and, in part, will be obvious from the description, or may be learned by practice of the present invention.

According to an embodiment of the present invention, there is provided a print data processing method of an image forming apparatus that has a storage unit, the method comprising setting at least one print speed enhancing mode; performing a pre-processing corresponding to the set print speed enhancing mode; and processing the print data by using a result of the pre-processing.

According to aspects of the present invention, the method may further comprise storing the pre-processing result in the storage unit.

According to aspects of the present invention, the setting of the print speed enhancing mode may further comprise displaying at least one of a necessary capacity of the storage unit to perform the print speed enhancing mode and an available capacity of the storage unit.

According to aspects of the present invention, the print speed enhancing mode includes a plurality of selection items and the necessary capacity of the storage unit to perform the print speed enhancing mode differs according to the selected selection item among the plurality of selection items of the print speed enhancing mode.

According to aspects of the present invention, the plurality of selection items of the print speed enhancing mode may comprise at least one of a mono font, a color font, a color image and color all data.

According to aspects of the present invention, the setting of the print speed enhancing mode may comprise editing at least one of the selection items of the print speed enhancing mode.

According to aspects of the present invention, the performing of the pre-processing may comprise performing the pre-processing corresponding to the capacity of the storage unit.

According to aspects of the present invention, the pre-processing may comprise at least one of color correction and color conversion.

According to aspects of the present invention, the pre-processing may comprise generating a pattern corresponding to pattern information.

According to aspects of the present invention, the performing of the pre-processing may comprise performing the pre-processing automatically if the image forming apparatus is turned on.

According to aspects of the present invention, the processing the print data may comprise using information generated by the pre-processing without additionally generating print information.

According to another embodiment of the present invention, there is provided a print data processing method of an image forming apparatus that has a storage unit, the method comprising: performing a pre-processing corresponding to a pre-selected print speed enhancing mode; and processing the print data by using a result of the pre-processing.

According to another embodiment of the present invention, there is provided an image forming apparatus, comprising: an image forming unit; and a processing unit that sets at least one print speed enhancing mode, performs a pre-processing corresponding to the set print speed enhancing mode and processes print data by using a result of the pre-processing to transmit the print data to the image forming unit.

According to aspects of the present invention, the image forming apparatus may further comprise a storage unit that stores the pre-processing result therein.

According to aspects of the present invention, the storage unit may comprise at least one of an embedded memory, a hard disk drive (HDD) and an external memory that is connectable to the image forming apparatus.

According to aspects of the present invention, the image forming apparatus may further comprise a display unit that displays at least one of a necessary capacity of the storage unit to perform the print speed enhancing mode and a currently-available capacity of the storage unit.

According to aspects of the present invention, the necessary capacity of the storage unit to perform the print speed enhancing mode may differ according to a selected selection item among a plurality of selection items of the print speed enhancing mode.

According to aspects of the present invention, the plurality of selection items of the print speed enhancing mode may comprise at least one of a mono font, a color font, a color image and color all data.

The pre-processing may be performed in accordance with the capacity of the storage unit.

According to aspects of the present invention, the pre-processing may comprise at least one of color correction and color conversion.

According to aspects of the present invention, the pre-processing may comprise generating a pattern corresponding to pattern information.

According to aspects of the present invention, the pre-processing may be automatically performed if the image forming apparatus is turned on.

According to aspects of the present invention, the processing unit may process print data by using information generated by the pre-processing without additionally generating print information.

According to another embodiment of the present invention, there is provided a print data processing apparatus for use in an image forming apparatus, comprising a storage unit that stores a pre-processing result; and a processing unit that sets at least one print speed enhancing mode, performs a pre-processing corresponding to the set print speed enhancing mode, stores the preprocessing result in the storage unit, processes print data by using the stored result of the pre-processing and transmits the processed print data to be printed by an image forming unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates a process of editing the print speed enhancing mode;

DETAILED DESCRIPTION OF THE EMBODIMENTS

Figure 1:
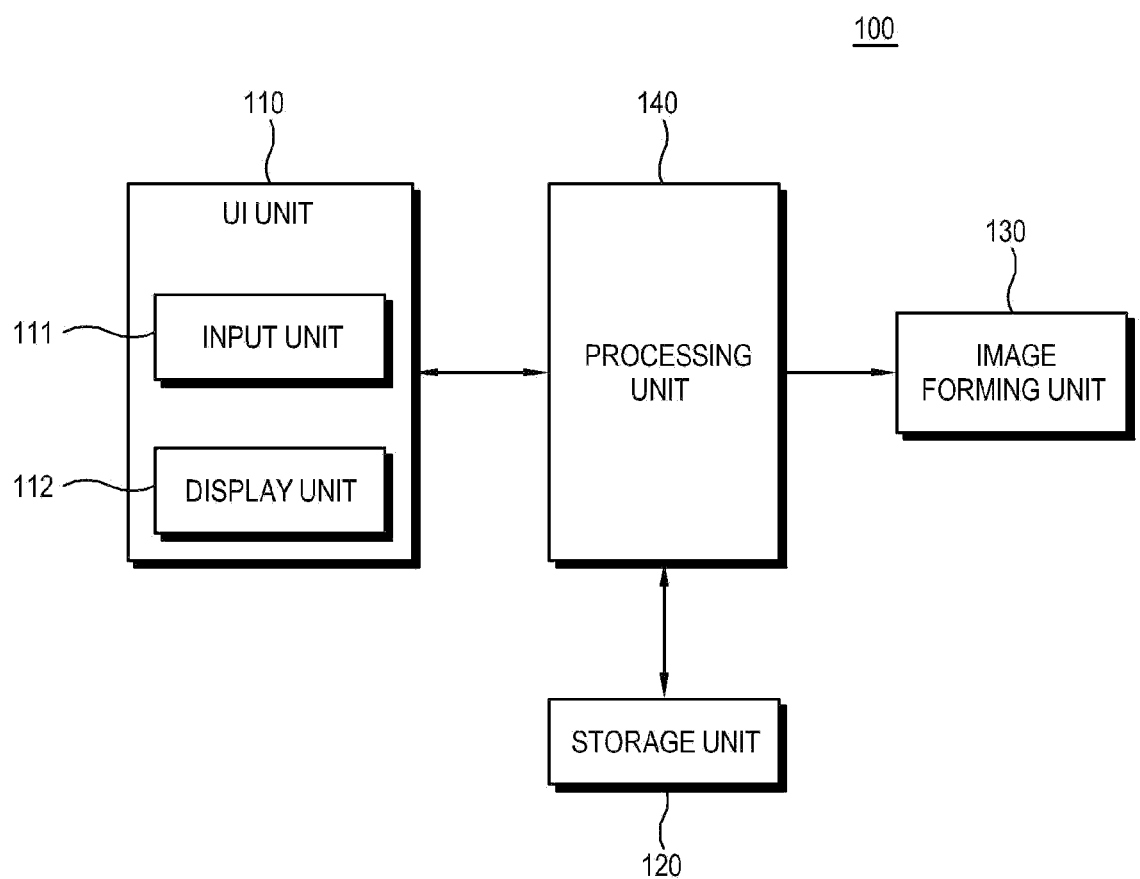
FIG. 1 is a block diagram of an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image forming apparatus 100 according to an embodiment of the present invention. The image forming apparatus 100 according to the present embodiment interprets input data transmitted by an image processing apparatus such as a computer system or an external storage apparatus according to a print language, renders (e.g. POR-renders) the interpreted data and processes print data to print the processed data. The print data may include a bitmap image. The image forming apparatus 100 according to an aspect of the present invention may include a printer, a photocopier, a facsimile, a multi-function device, etc. The print language according to the present invention may include a PDL (page description language). However, it is to be understood that other languages may be used.

The image forming apparatus 100 according to aspects of the present invention performs a pre-processing to set a print speed enhancing mode and processes print data by using a result value of the pre-processing to print the processed data.

As shown in FIG. 1, the image forming apparatus 100 includes a UI (user interface) unit 110, a storage unit 120, an image forming unit 130 and a processing unit 140. The UI unit 110 generates a user interface and includes an input unit 111 and a display unit 112. While shown as separate, it is to be understood that the input unit 111 and the display unit 112 can be combined, as in a touch screen display. Further, the UI unit 110 can be separate from or included in a common housing of the apparatus 100.

The input unit 111 receives a user's command to set at least one print speed enhancing mode. The input unit 111 may include a function key, such as a number key, etc., to select functions of the image forming apparatus 100. The input unit 111 may further include an additional function key to receive a user's command to perform the pre-processing.

The display unit 112 displays a user interface (UI) thereon to set the print speed enhancing mode. More specifically, the display unit 112 may display a necessary capacity of the storage unit 120 (that is, a capacity of the storage unit that is necessary to perform the pre-processing), and the currently-available capacity of the storage unit 120. As a non-limiting example, the display unit 112 may include a TFT-LCD (thin film transistor-liquid crystal display) and a driver (not shown) to drive the TFT-LCD. It is to be understood that other types of displays may be used.

The storage unit 120 stores therein a result value (hereinafter, to be called the "anticipated result value") of the pre-processing to set the print speed enhancing mode. As non-limiting examples, the storage unit 120 may include an embedded memory such as a flash memory, a hard disk drive (HDD), or an external memory connectable to the image forming apparatus 100. The external memory may include a memory card, a USB memory, a host apparatus, a server, etc.

More specifically, the anticipated result value that is stored in the storage unit 120 includes source information, pattern information and destination (e.g. position and size) information relating to color correction and color conversion.

The term "print speed enhancing mode" refers to a mode in which pre-processing result values of some input data are stored in the storage unit 120, and input data are processed by using information generated by the pre-processing (i.e., by using the result value without generating information to print if a print command is received). Thus, the print speed is enhanced.

The print speed enhancing mode may be selected according to a plurality of selection items. The plurality of selection items for the print speed enhancing mode may include "mono font," "color font," "color image," "color all data," etc. The selection items for the print speed enhancing mode may be added, removed or changed.

The necessary capacity of the storage unit 120 varies according to the available options of the print speed enhancing mode. That is, depending on the plurality of selection items of the print speed enhancing mode, the necessary capacity of the storage unit 120 may increase or decrease.

The image forming unit 130 prints an image based on the generated print data.

The processing unit 140 performs a processing according to the print speed enhancing mode by using the anticipated result values stored in the storage unit 120. The processing unit 140 according to aspects of the present invention may include a central processing unit (CPU) coupled with firmware, but is not limited thereto. As such, aspects can be implemented as software encoded on a computer readable medium to be implemented by one or more computers and/or processors.

The processing according to aspects of the present invention includes print data processing, which is performed by using the anticipated result values of the pre-processing stored in the storage unit 120. The processing includes a process of rendering the data generated by the anticipated result values and generating final print data. The generated print data may include a bitmap image. That is, the pre-processing may include pre-storing the anticipated result value in the storage unit 120.

Hereinafter, a print data processing process of the image forming apparatus 100 having the foregoing configuration will be described with reference to FIGS. 2 to 8.

Figure 2:
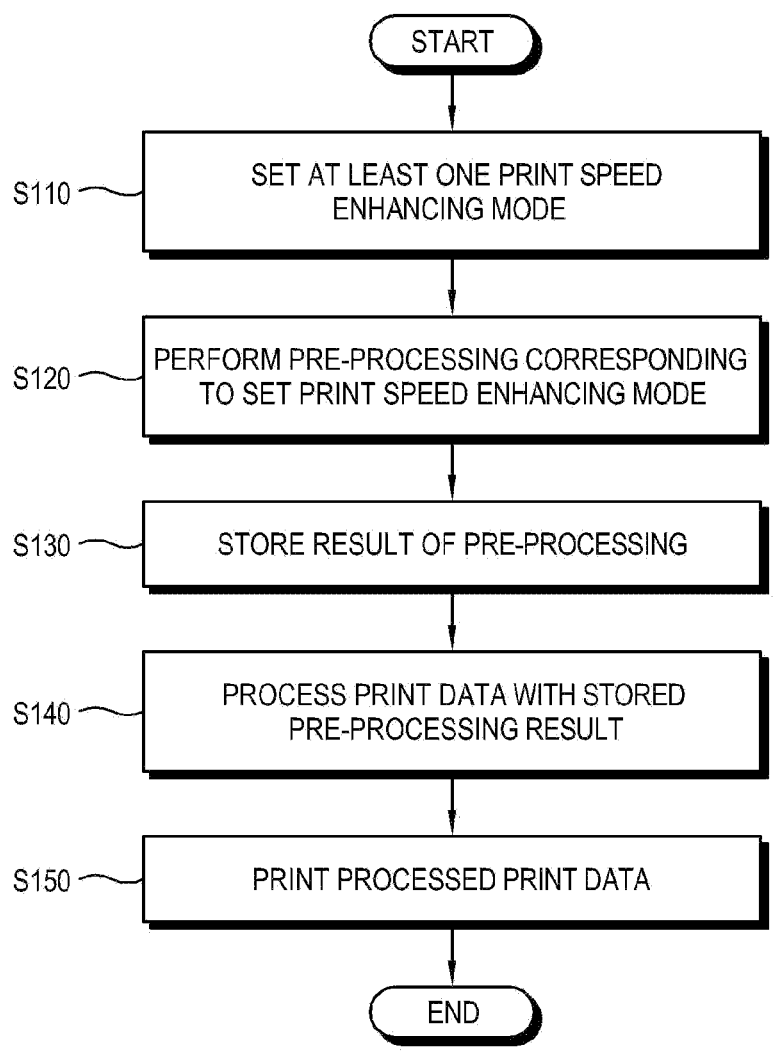
FIG. 2 is a flowchart to describe a print data processing method using the image forming apparatus of FIG. 1.
Figure 3:
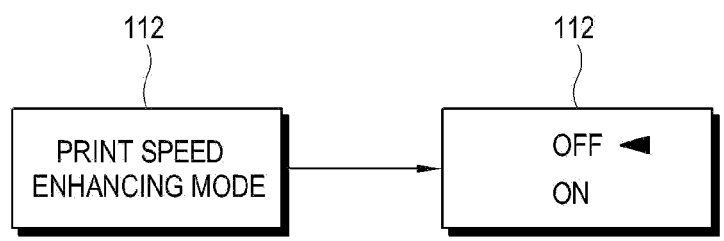
FIG. 3 illustrates a UI (user interface) to set a print speed enhancing mode according to image forming apparatus of FIG. 1 and the method of FIG. 2.

As shown in FIG. 2, the image forming apparatus 100 may set at least one print speed enhancing mode according to a user's command (S110). As shown in FIG. 3, the display unit 112 displays a selection on the UI unit 110 to set the print speed enhancing mode and a user selects through the input unit 111 whether to turn the print speed enhancing mode on or off.

Figure 4:
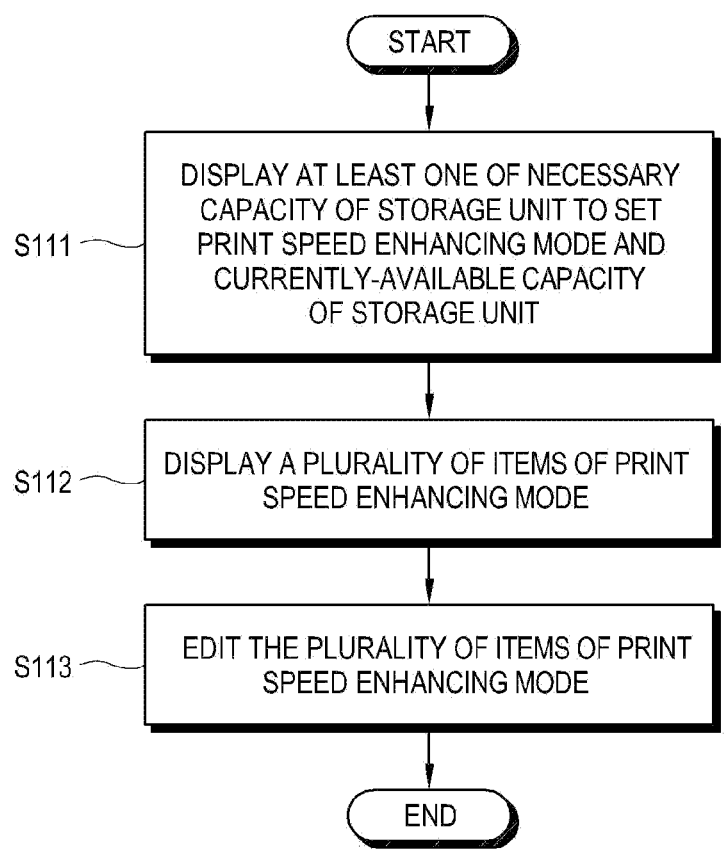
FIG. 4 is a flowchart to describe a process of setting the print speed enhancing mode.
Figure 5:
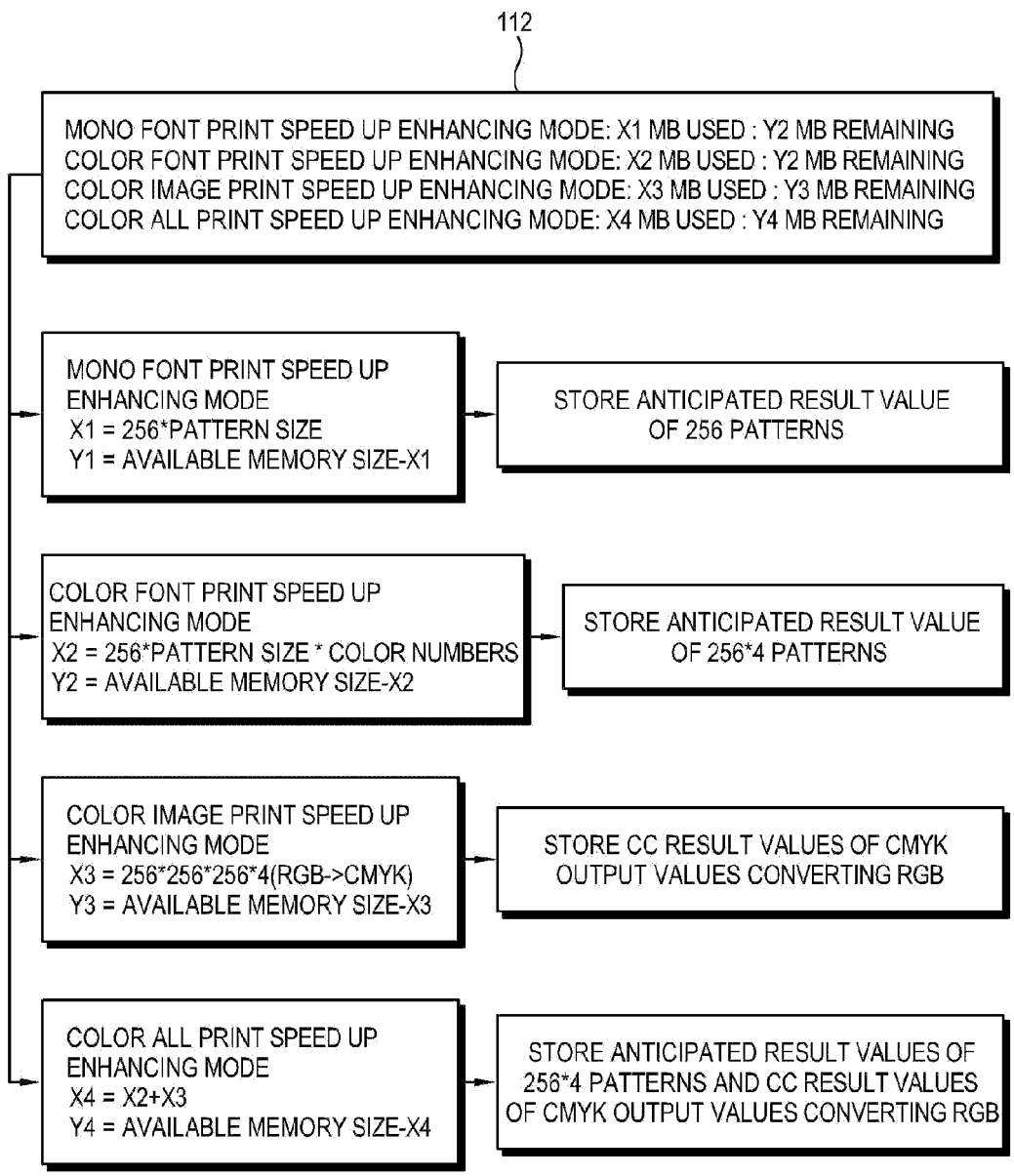
FIG. 5 illustrates the process of setting the print speed enhancing mode.
Figure 7:
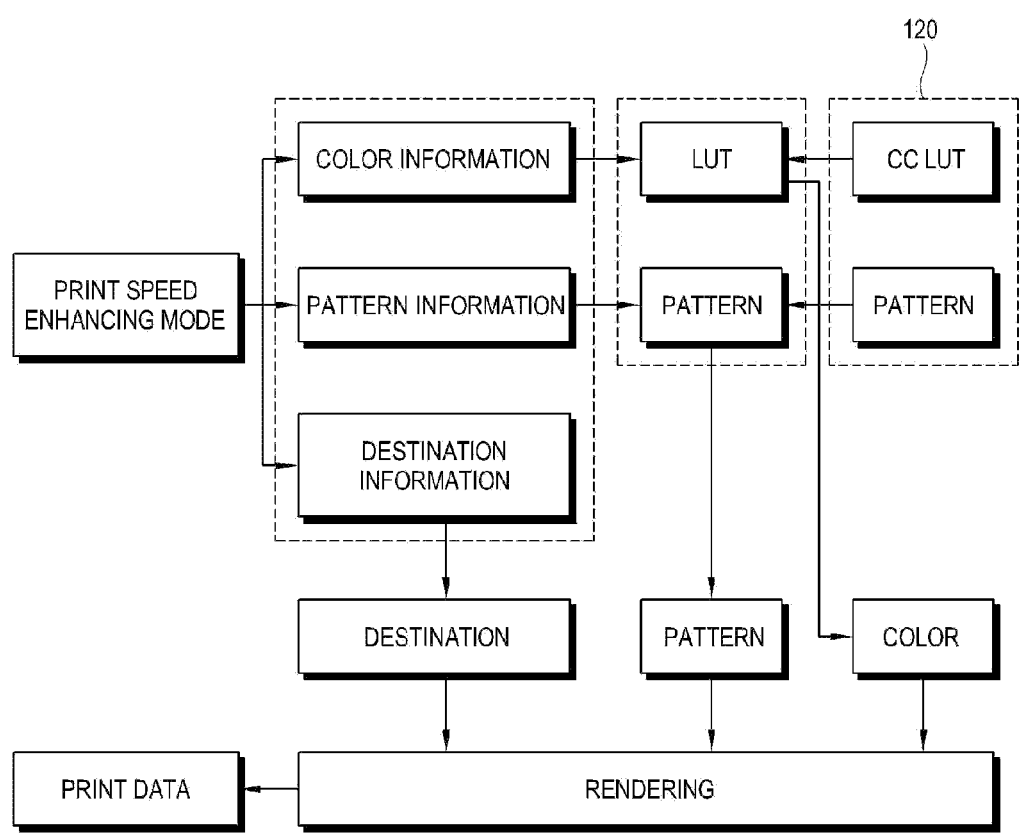
FIG. 7 illustrates the print data processing method in the print speed enhancing mode.

Referring to FIG. 4 and FIG. 5, in operation S110, the image forming apparatus 100 may display at least one of the necessary capacity of the storage unit 120 to set the print speed enhancing mode and the currently-available capacity of the storage unit 120 (S111). The display unit 112 may display the plurality of selection items of the print speed enhancing mode (S112). More specifically, the display unit 112 may display the necessary capacities (X1 to X4) of the storage unit 120, i.e., the memory capacity needed to carry out preprocessing, and currently-available capacities (Y1 to Y4) of the storage unit 120 with respect to each of the plurality of selection items as shown in FIG. 5.

More specifically, 8 bit data that has source information and pattern information about the color correction and color conversion includes values from zero to 255. That is, the number of possible values for the overall data is 256.

As shown in FIG. 5, a capacity X1 of the storage unit 120 corresponding to 256*the pattern size is necessary to set the mono font print speed enhancing mode. As anticipated result values of CMYK four colors are stored corresponding to the 256*pattern size, a capacity X2 of the storage unit 120 corresponding to 256*pattern size*4 is necessary to set a color font print speed enhancing mode.

If the input data has coordinate values corresponding to RGB colors, a capacity X3 of the storage unit 120 corresponding to 256*256*256*4 is necessary to store the anticipated result values of RGB colors converted into the CMYK colors and to set a color image print speed enhancing mode.

A capacity of X2+X3=X4 of the storage unit 120 is necessary to store all anticipated result values and to set color all data including a color font/color image in the print speed enhancing mode.

A user may determine the necessary capacities X1 to X4 of the storage unit 120 to set the plurality of selection items in the print speed enhancing mode and the currently-available capacities Y1 to Y4 of the storage unit 120 through the display unit 112 and set the print speed enhancing mode.

The input unit 111 may edit the plurality of selection items of the print speed enhancing mode displayed at operation S112 (S113). More specifically, the display unit 112 displays the currently-set print speed enhancing modes, and edits the print speed enhancing mode by changing or adding selection items to the plurality of print speed enhancing modes according to user's input through the input unit 111 as shown in FIG. 6. The editing options of the print speed enhancing mode may include "EDIT", "DELETE", "COPY", "MOVE", etc.

Referring again to FIG. 2, the processing unit 140 performs the pre-processing corresponding to the print speed enhancing mode set at operation S110 (S120). The processing unit 140 may automatically perform the pre-processing if the image forming apparatus 100 is turned on.

The storage unit 120 stores therein the result data from the pre-processing performed at operation S120 (S130).

The data stored in the storage unit 120 includes the anticipated result values about the color conversion and pattern generation which are consistently maintained.

For example, the image forming apparatus 100 may correct colors of original RGB data among the input data to generate new RGB data and convert the new RGB data into CMYK data. If the coordinate values of the original RGB data are equivalent, the coordinate values of the converted CMYK data are also equivalent.

More specifically, in case of 8 bit data, if a user selects the mono font print speed enhancing mode, the storage unit 120 stores therein the anticipated result values for the 256 patterns. If a user selects the color font print speed enhancing mode, the storage unit 120 stores therein anticipated result values for four colors with respect to the 256 patterns. If a user selects the color image print speed enhancing mode, the storage unit 120 stores therein the color conversion (CC) result value information of CMYK output values with respect to inputtable RGB data as an LUT (lookup table). If a user selects color all data, including the color font/color image, in the print speed enhancing mode, the storage unit 120 stores therein anticipated result values of four colors with respect to the 256 patterns and the LUT storing the CC result value information of CMYK output values with respect to inputtable RGB data. That is, the LUT according to aspects of the present invention includes output values of the input data.

The processing unit 140 processes the print data by using the anticipated result values stored in the storage unit 120 at operation S130 (S140). More specifically, referring to FIG. 7, if the input data is transmitted from the image processing apparatus while the print speed enhancing mode is set, the processing unit 140 extracts the color information, pattern information and destination information from the received input data and outputs anticipated result values stored in the storage unit 120 corresponding to the extracted information.

The processing unit 140 renders the outputted result values corresponding to the source, pattern and destination information to form a bitmap image.

If the color conversion is to be performed, an operation of calculating result values is unnecessary, since the processing unit 140 uses the CMYK result values stored in the LUT with respect to the inputted RGB data. That is, the image forming apparatus 100 processes the print data by using the information generated by the pre-processing without generating additional print information and thereby saves printing time.

The image forming unit 140 prints the print data processed at operation S140 (S150).

Figure 8:
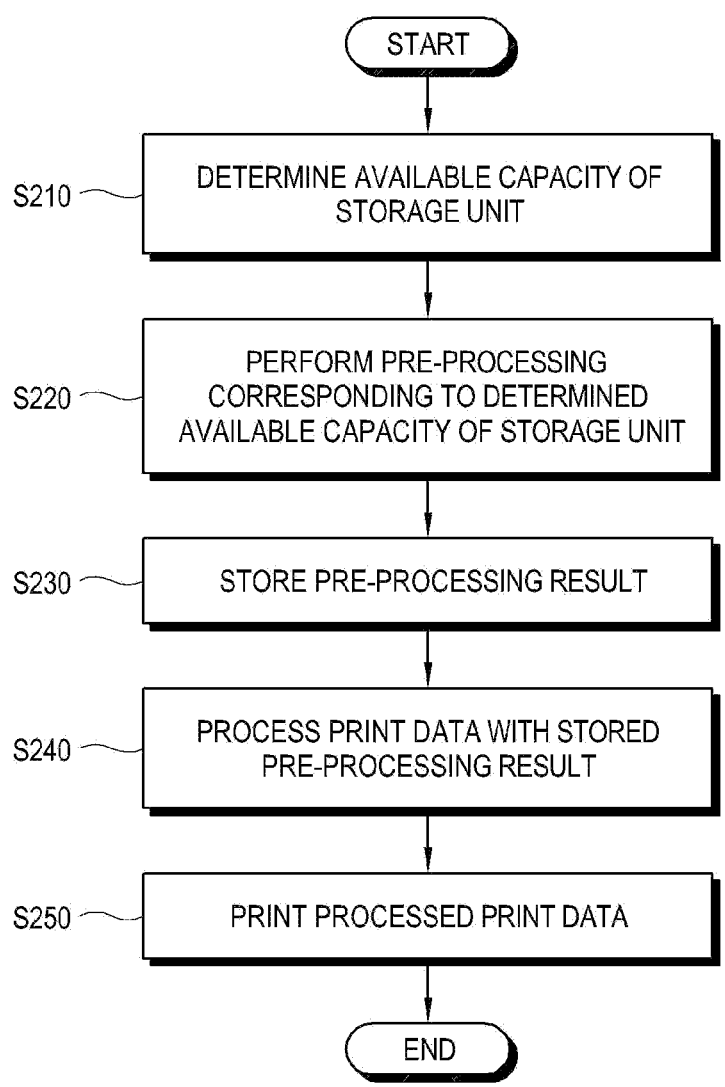
FIG. 8 is a flowchart to describe a print data processing method according to another exemplary embodiment of the present invention.

As shown in FIG. 8, an image forming apparatus 100 according to another embodiment of the present invention may determine an available capacity of a storage unit 120 during a manufacturing process regardless of user's selection (S210). The image forming apparatus 100 may perform a pre-processing corresponding to the available capacity of the storage unit 120 determined at operation S210 (S220). A processing unit 140 may automatically perform the pre-processing if the image forming apparatus 100 is turned on.

The image forming apparatus 100 stores results of the pre-processing performed at operation S220 in the storage unit 120 (S230).

The processing unit 140 processes print data by using the pre-processing result stored in the storage unit 120 (S240).

The image forming unit 140 prints the print data processed at operation S240 (S250).

The print speed enhancing mode that is set as a default in the image forming apparatus 100 may be changed or added later by a user.

As described above, aspects of the present invention provide an image forming apparatus and a print data processing method thereof to store an anticipated result value of a processing having equivalent result values and process print data by using the stored anticipated result value if a print command is received, thereby improving the print speed, and.

Also, aspects of the present invention provide an image forming apparatus and a print data processing method thereof to perform in advance a processing having equivalent result values, thereby avoiding repetitive operations by using the result values and improving operation efficiency, and.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A print data processing method of an image forming apparatus that has a storage unit, the method comprising:
setting at least one print speed enhancing mode;
performing a pre-processing corresponding to the set print speed enhancing mode; and
processing the print data by using a result of the pre-processing without generating information for printing the print data if a print command is received, wherein the result of the pre-processing comprises at least one information relating to color correction and/or color conversion;
wherein setting at least one print speed enhancing mode comprises selecting from a plurality of selection items based on a type of data to be processed;
wherein the pre-processing extracts color information, pattern information and destination from the data to be processed;
wherein the performing of the pre-processing comprises performing the pre-processing according to a determined capacity of the storage unit;
wherein the setting of the print speed enhancing mode further comprises displaying at least one of a necessary capacity of the storage unit to perform the print speed enhancing mode and/or an available capacity of the storage unit.

2. The method according to claim 1, further comprising storing the pre-processing result in the storage unit.

3. The method according to claim 1, wherein the print speed enhancing mode includes a plurality of selection items according to which the print speed enhancing mode is selectable, and wherein the necessary capacity of the storage unit to perform the print speed enhancing mode differs according to a selected selection item among the plurality of selection items of the print speed enhancing mode.

4. The method according to claim 3, wherein the plurality of selection items according to which the print speed enhancing mode is selectable comprises at least one of a mono font, a color font, a color image and color all data.

5. The method according to claim 3, wherein the setting of the print speed enhancing mode comprises editing at least one of the selection items of the print speed enhancing mode.

6. The method according to claim 1, wherein the performing of the pre-processing comprises performing the pre-processing according to a determined capacity of the storage unit.

7. The method according to claim 1, wherein the pre-processing comprises color correction and/or color conversion.

8. The method according to claim 1, wherein the performing of the pre-processing comprises generating a pattern corresponding to pattern information.

9. The method according to claim 1, wherein the performing of the pre-processing comprises performing the pre-processing automatically when the image forming apparatus is turned on.

10. The method according to claim 1, wherein the processing of the print data comprises using information generated by the pre-processing without additionally generating print information.

11. The method of claim 2, wherein the processing comprises recalling the stored preprocessing result from the storage unit and generating the print data using the recalled pre-processing result.

12. An image forming apparatus, comprising:
an image forming unit to print an image on a medium according to print data; and
a processing unit that sets at least one print speed enhancing mode, selecting from a plurality of selection items based on a type of data to be processed, performs a pre-processing corresponding to the set print speed enhancing mode, processes print data by using a result of the pre-processing without generating information for printing the print data if a print command is received and transmits the processed print data to the image forming unit, and
a display unit that displays at least one of a necessary capacity of a storage unit to perform the print speed enhancing mode and a currently-available capacity of the storage unit;
wherein the result of the pre-processing comprises at least one information relating to color correction and/or color conversion;

wherein the pre-processing extracts color information, pattern information and destination from the data to be processed;

wherein the performing of the pre-processing comprises performing the pre-processing according to a determined capacity of the storage unit.

13. The image forming apparatus according to claim 12, further comprising the storage unit that stores the pre-processing result.

14. The image forming apparatus according to claim 13, wherein the storage unit comprises at least one of an embedded memory, a hard disk drive and an external memory that is connectable to the image forming apparatus.

15. The image forming apparatus according to claim 12, wherein the necessary capacity of the storage unit to perform the print speed enhancing mode differs according to a selected selection item among a plurality of selection items of the print speed enhancing mode.

16. The image forming apparatus according to claim 15, wherein the plurality of selection items of the print speed enhancing mode comprises at least one of a mono font, a color font, a color image and color all data.

17. The image forming apparatus according to claim 13, wherein the pre-processing is performed by the processing unit in accordance with a determined capacity of the storage unit.

18. The image forming apparatus according to claim 12, wherein the pre-processing performed by the processing unit comprises color correction and/or color conversion.

19. The image forming apparatus according to claim 12, wherein the pre-processing performed by the processing unit comprises generating a pattern corresponding to pattern information.

20. The image forming apparatus according to claim 12, wherein the pre-processing performed by the processing unit is automatically performed when the image forming apparatus is turned on.

21. The image forming apparatus according to claim 12, wherein the processing unit processes the print data by using information generated by the pre-processing without additionally generating print information.

22. A print data processing apparatus for use in an image forming apparatus, comprising:

a storage unit that stores a pre-processing result;

a processing unit that sets at least one print speed enhancing mode, selecting from a plurality of selection items based on a type of data to be processed, performs a pre-processing corresponding to the set print speed enhancing mode, stores the preprocessing result in the storage unit, processes print data by using the stored result of the pre-processing without generating information for printing the print data if a print command is received and transmits the processed print data to be printed by an image forming unit, and a display unit that displays at least one of a necessary capacity of the storage unit to perform the print speed enhancing mode and a currently-available capacity of the storage unit;

wherein the result of the pre-processing comprises at least one information relating to color correction and/or color conversion;

wherein the pre-processing extracts color information, pattern information and destination from the data to be processed;

wherein the performing of the pre-processing comprises performing the pre-processing according to a determined capacity of the storage unit.

* * * * *

UNITED STATES PATENT AND TRADEMARK OFFICE
CERTIFICATE OF CORRECTION

| | |
|---|---|
| PATENT NO. | : 8,625,115 B2 |
| APPLICATION NO. | : 12/268007 |
| DATED | : January 7, 2014 |
| INVENTOR(S) | : Woo |

Page 1 of 1

It is certified that error appears in the above-identified patent and that said Letters Patent is hereby corrected as shown below:

In the Claims

Column 8, Line 51, In Claim 13, after "data;" delete "and".

Signed and Sealed this
Eighth Day of July, 2014

Michelle K. Lee
*Deputy Director of the United States Patent and Trademark Office*